United States Patent
Gisin

(10) Patent No.: US 7,606,367 B2
(45) Date of Patent: Oct. 20, 2009

(54) QUANTUM CRYPTOGRAPHY WITH FEWER RANDOM NUMBERS

(75) Inventor: Nicolas Gisin, Vessy (CH)

(73) Assignee: Universrité de Geneve, Geneva (CH)

( * ) Notice: Subject to any disclaimer, the term of this patent is extended or adjusted under 35 U.S.C. 154(b) by 779 days.

(21) Appl. No.: 11/074,940

(22) Filed: Mar. 9, 2005

(65) Prior Publication Data

US 2005/0201563 A1     Sep. 15, 2005

Related U.S. Application Data

(60) Provisional application No. 60/551,041, filed on Mar. 9, 2004.

(51) Int. Cl.
H04L 9/00 (2006.01)
H04K 1/00 (2006.01)

(52) U.S. Cl. ..................... 380/256
(58) Field of Classification Search .......... None
See application file for complete search history.

(56) References Cited

U.S. PATENT DOCUMENTS

| | | | | |
|---|---|---|---|---|
| 5,307,410 A * | 4/1994 | Bennett | ............ | 380/256 |
| 6,438,234 B1 * | 8/2002 | Gisin et al. | ............ | 380/256 |
| 7,359,513 B2 * | 4/2008 | Gisin et al. | ............ | 380/256 |
| 7,460,669 B2 * | 12/2008 | Foden et al. | ............ | 380/256 |
| 2004/0184603 A1 * | 9/2004 | Pearson et al. | ............ | 380/28 |
| 2004/0184615 A1 * | 9/2004 | Elliott et al. | ............ | 380/283 |
| 2006/0083376 A1 * | 4/2006 | Kawamoto et al. | ............ | 380/256 |
| 2008/0292099 A1 * | 11/2008 | Gisin et al. | ............ | 380/29 |

OTHER PUBLICATIONS

Gisin et al, "Quantum Cryptography", Jan. 2002, Reviews of Modern Physics, Vol. 74, p. 145-195.*

* cited by examiner

Primary Examiner—Christopher A Revak
(74) Attorney, Agent, or Firm—Browdy and Neimark, PLLC

(57) ABSTRACT

An apparatus and method for implementing a quantum cryptography system that requires fewer random bits. The emitter divides the key in blocks of bits. Instead of changing the basis for each bit of key sent by the emitter, the same basis is used for all the bits within a block. By doing this, the rate of random bits of information necessary for the implementation of a secure quantum cryptography link is reduced.

4 Claims, 4 Drawing Sheets

Figure 4

| Block | #1 | | | | | | #2 | | | | | | #3 | | | | | |
|---|---|---|---|---|---|---|---|---|---|---|---|---|---|---|---|---|---|---|
| Emitter Block Basis Information | 1 | 0 | 1 | 1 | 1 | 1 | 0 | 1 | 0 | 0 | 0 | 0 | 0 | 0 | 1 | 0 | 0 | 1 |
| Emitter Bit Value Information | 0 | 0 | 1 | 0 | 0 | 1 | 1 | 0 | 0 | ... | 1 | 1 | 1 | 0 | 0 | 1 | 0 | 1 |
| Receiver Block Basis Information | 1 | 1 | 1 | 1 | 0 | 1 | 0 | 1 | 1 | ... | 1 | 1 | 0 | 0 | 1 | 1 | 0 | 1 |
| Receiver Bit Value Information | 0 | 0 | 1 | 0 | 1 | 1 | 0 | 1 | 1 | ... | 0 | 0 | 1 | 1 | 0 | 1 | 0 | 1 |
| Bases Compatible (✓) or Incompatible (✗) | ✓ | ✗ | ✓ | ✓ | ✗ | ✓ | ✗ | ✓ | ✗ | ✗ | ✗ | ✗ | ✗ | ✓ | ✓ | ✓ | ✓ | ✓ |
| Key after basis reconciliation | 0 | | 1 | 0 | | 1 | | 1 | | | | | | 1 | 0 | 1 | 0 | 1 |

QUANTUM CRYPTOGRAPHY WITH FEWER RANDOM NUMBERS

BACKGROUND OF THE INVENTION

1. Field of the Invention

This invention relates generally to the field of quantum cryptography, and more particularly to a method for using fewer random numbers in the implementation of quantum cryptography protocols.

2. Description of the Prior Art

If two users possess shared random secret information (below the "key"), they can achieve, with provable security, two of the goals of cryptography: 1) making their messages unintelligible to an eavesdropper and 2) distinguishing legitimate messages from forged or altered ones. A one-time pad cryptographic algorithm achieves the first goal, while Wegman-Carter authentication achieves the second one. Unfortunately both of these cryptographic schemes consume key material and render it unfit for use. It is thus necessary for the two parties wishing to protect the messages they exchange with either or both of these cryptographic techniques to devise a way to exchange fresh key material. The first possibility is for one party to generate the key and to inscribe it on a physical medium (disc, cd-rom, rom) before passing it to the second party. The problem with this approach is that the security of the key depends on the fact that it has been protected during its entire lifetime, from its generation to its use, until it is finally discarded. In addition, it is very unpractical and tedious.

Because of these difficulties, in many applications one resorts instead to purely mathematical methods allowing two parties to agree on a shared secret over an insecure communication channel. Unfortunately, all such mathematical methods for key agreement rest upon unproven assumptions, such as the difficulty of factoring large integers. Their security is thus only conditional and questionable. Future mathematical developments may prove them totally insecure.

Quantum cryptography (QC) is the only method allowing the distribution of a secret key between two distant parties, the emitter and the receiver, with a provable absolute security. An explanation of the method can be found in Nicolas Gisin, Grégoire Ribordy, Wolfgang Tittel, and Hugo Zbinden, "Quantum Cryptography", Rev. of Mod. Phys. 74, (2002). Both parties encode the key on elementary quantum systems, such as photons, which they exchange over a quantum channel, such as an optical fiber. The security of this method comes from the well-known fact that the measurement of an unknown quantum state modifies the state itself: a spy eavesdropping on the quantum channel cannot get information on the key without introducing errors in the key exchanged between the emitter and the receiver. In equivalent terms, QC is secure because of the no-cloning theorem of quantum mechanics: a spy cannot duplicate the transmitted quantum system and forward a perfect copy to the receiver.

Several QC protocols exist. These protocols describe how the bit values are encoded on quantum states and how the emitter and the receiver cooperate to produce a secret key. The most commonly used of these protocols, which was also the first one to be invented, is known as the Bennett—Brassard 84 protocol (BB84), disclosed by Charles Bennett and Gilles Brassard in Proceedings IEEE Int. Conf. on Computers, Systems and Signal Processing, Bangalore, India (IEEE, New York, 1984), pp. 175-179. The emitter encodes each bit on a two-level quantum system either as an eigenstate of $\sigma_x$ (|+x> coding for "0" and |-x> coding for "1") or as an eigenstate of $\sigma_y$ (|+y> or |-y>, with the same convention). One says that the bits are encoded in two incompatible bases. For each bit, the emitter uses an appropriate random number generator to generate two random bits of information, which are used to determine the bit value (one random bit) and the basis information (one random bit). The quantum system is sent to the receiver, who analyses it in one of the two bases, i.e measures either $\sigma_x$ or $\sigma_y$. The receiver uses an appropriate random number generator to produce a random bit of information used to determine in the measurement basis (the basis information). The measurement basis is changed for each quantum system. After the exchange of a large number of quantum systems, the emitter and the receiver perform a procedure called basis reconciliation. The emitter announces to the receiver, over a conventional and public communication channel the basis x or y (eigenstate of $\sigma_x$ or $\sigma_y$) in which each quantum system was prepared. When the receiver has used the same basis as the emitter for his measurement, he knows that the bit value he has measured must be the one which was sent over by the emitter. He indicates publicly for which quantum systems this condition is fulfilled. Measurements for which the wrong basis was used are simply discarded. In the absence of a spy, the sequence of bits shared is error free. Although a spy who wants to get some information about the sequence of bits that is being exchanged can choose between several attacks, the laws of quantum physics guarantee that he will not be able to do so without introducing a noticeable perturbation in the key.

Other protocols—like the Bennett 92 (B92)—have also been proposed. The so-called B92 protocol was disclosed by Charles Bennett in Phys. Rev. Lett. 68, 3121 (1992).

In practice, the apparatuses are imperfect and also introduce some errors in the bit sequence. In order to still allow the production of a secret key, the basis reconciliation part of the protocol is complemented by other steps. This whole procedure is called key distillation. The emitter and the receiver check the perturbation level, also know as quantum bit error rate (QBER), on a sample of the bit sequence in order to assess the secrecy of the transmission. In principle, errors should be encountered only in the presence of an eavesdropper. In practice however, because of the imperfections of the apparatus, a non-zero error probability is always observed. Provided this probability is not too large, it does not prevent the distillation of a secure key. These errors can indeed be corrected, before the two parties apply a so called privacy amplification algorithm that will reduce the information quantity of the spy to an arbitrarily low level.

In the last years, several demonstrations of QC systems have been implemented using photons as the information carriers and optical fibers as quantum channels. While the original proposal called for the use of single photons as elementary quantum systems to encode the key, their generation is difficult and good single-photon sources do not exist yet. Instead, most implementations have relied on the exchange between the emitter and the receiver of weak coherent states, such as weak laser pulses, as approximations to ideal elementary quantum systems.

SUMMARY OF THE INVENTION

The primary object of the invention is to allow implementing quantum cryptography with fewer random numbers.

All the protocols for quantum cryptography proposed until now follow the same general approach. Each bit of the random key sent by the emitter is encoded on a quantum system in one of several bases. The basis is changed randomly for each quantum system. As for the receiver, he measures the quantum system in one of the bases, the choice being made randomly. When the bases used by the emitter and the receiver are compatible, a bit of the random key is transmitted. In the case for example of the BB84 protocol, the emitter needs two random bits of information for each quantum system sent. One random bit is used to determine the bit value and the other random bit is used to determine the basis used. As for the receiver, he needs one random bit for each quantum system. This random bit determines the measurement basis.

In the past ten years, the bit rate of the practical quantum cryptography system developed have increased by several orders of magnitude. Unfortunately generating random numbers at a high frequency is not a trivial task for existing random number generators. If the bit rate of quantum cryptography systems continues to increase, the generation of random bits fast enough will become a critical issue.

We propose here to use fewer random bits, but to guarantee the same level of security. The idea is that the emitter divides the key he wants to send in blocks of n bits with $n \geq 2$. For each block, he sends n quantum systems corresponding to the n bits. He uses the same basis for the encoding of all the bits on the quantum systems within one particular block. The actual bit values remain random and independent of each other.

Although one might judge at first sight that doing so is detrimental to the security of the quantum cryptography implementation, it is actually not. It was proven by Nicolas Gisin, published under arXiv:quant-ph/0303052, that using the same basis in blocks of key does not reduce the security of the scheme.

The advantage of doing this is that the emitter needs (1+1/n) random bit of information for each quantum system sent, where n is the block size, instead of 2 if the basis is changed for each quantum system. For large block sizes, the reduction ratio goes to 2. As for the receiver, he only needs 1/n random bit of information for each quantum system sent instead of 1. These reductions in the required random number generation rate are important in practice.

It should be noted that the concept of using the same basis for a block of key applies very naturally to autocompensating quantum cryptography systems. With these systems, the quantum systems are indeed sent in blocks, in order to allow temporal separation of emission and reception. Doing this allows mitigating Rayleigh backscattering noise enhancement.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

FIG. 4 shows an example of a key exchange session showing the block basis information and the bit value information of the emitter, the block basis information and the bit value information of the receiver, and the key after basis reconciliation.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
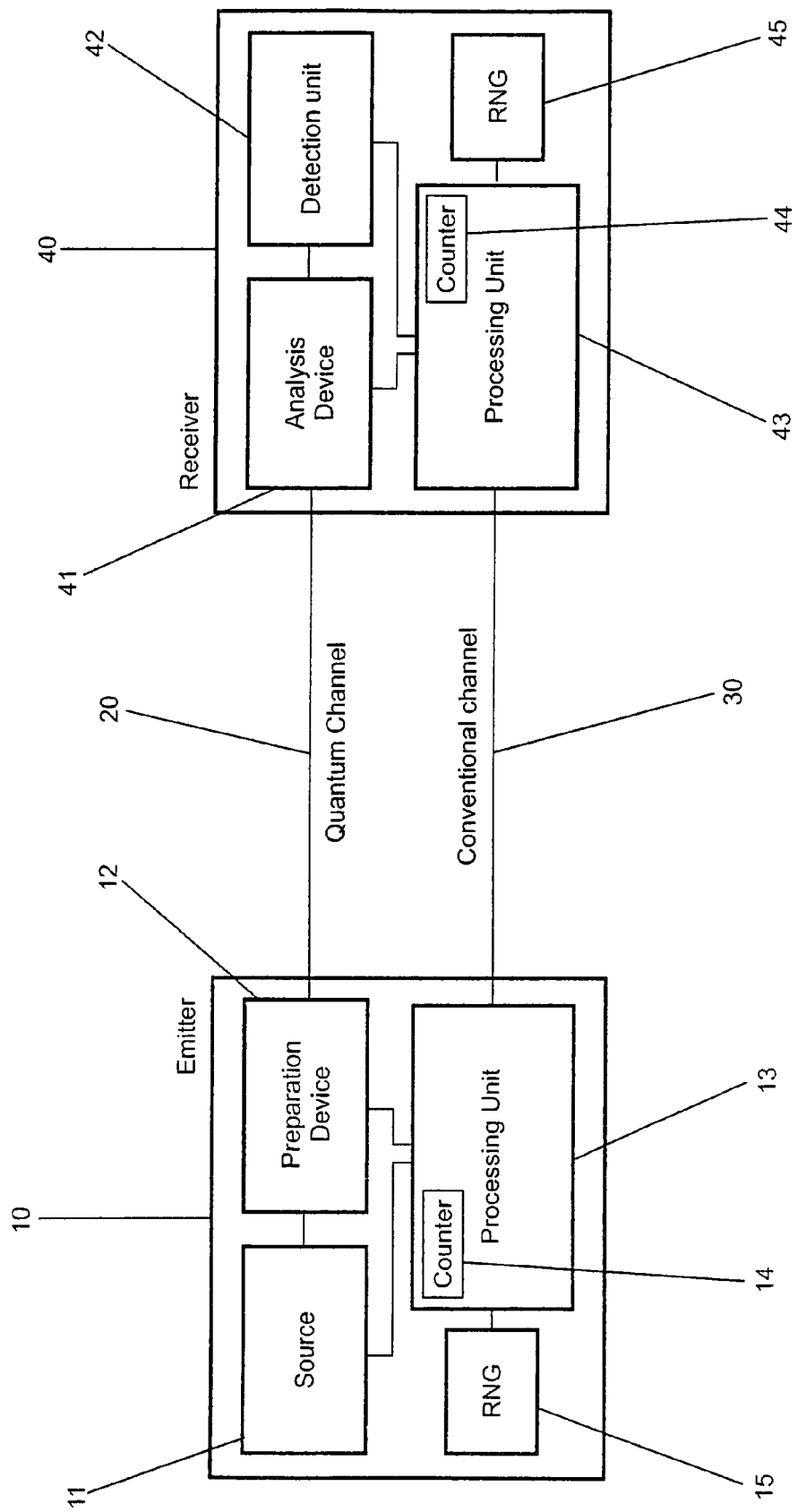
FIG. 1 shows one embodiment of the invention.

Referring to FIG. 1, one embodiment of the invention comprises an emitter 10 and a receiver 40 connected by a quantum channel 20 and a conventional channel 30. The emitter consists of a quantum state source 11 and a preparation device 12 controlled by a processing unit 13. The processing unit 13 comprises a counter 14 used to count the number of bits in a block of key. A random number generator 15 is connected to the processing unit 13. The receiver 40 consists of an analysis device 41 and a detection unit 42 controlled by a processing unit 43. The processing unit 43 comprises a counter 44 used to count the number of bits in a block of key. A random number generator 45 is connected to the processing unit 43.

The preparation device 12 of the emitter 10 can be used to transform the quantum state produced by the source 11 into four states belonging to two non-orthogonal bases. These states can for example be |+x>, |−x>, |+y> or |−y>. By convention, the emitter defines for example that the states |+x> and |+y> code for a bit value of "1" and the states |−x> and |−y> code for a bit value of "0". The actual state prepared by the preparation device 12 is controlled by two bits of information sent by the processing unit 13 to the preparation device 12.

The analysis device 41 of the receiver 40 is used to analyzed the quantum states received by the receiver 40. It can for example measure $\sigma_x$ or $\sigma_y$. When the analysis device 41 performs a measurement which is compatible with the quantum state received from the emitter 10 by the receiver 40, like for example in the case of a $\sigma_x$ measurement on a |+x> state, the result of this measurement registered by the detection unit 42 is deterministic. In this case, the emitter 10 and the receiver 40 will share one bit of key after basis reconciliation. If the analysis performed by the analysis device 41 is not compatible with the quantum state received from the emitter 10 by the receiver 40, like for example in the case of a $\sigma_y$ measurement on a |+x> state, the result of this measurement registered by the detection unit 42 is probabilistic. This case will not allow the emitter 10 and the receiver 40 to produce one bit of key after basis reconciliation.

Figure 2:
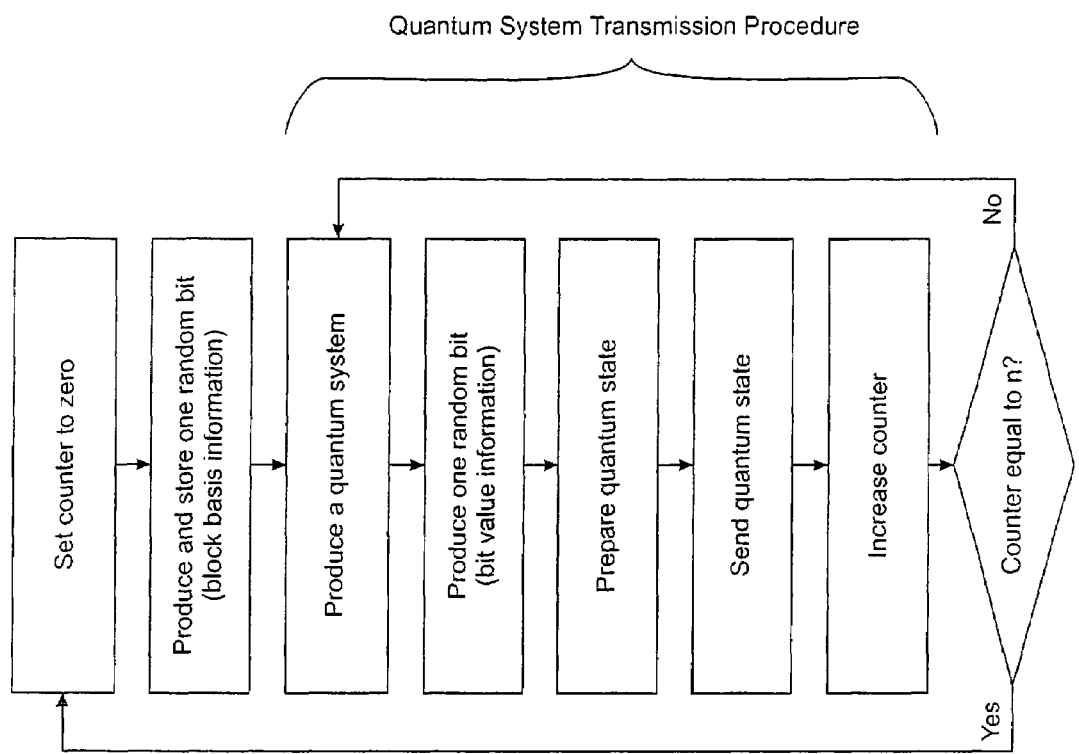
FIG. 2 show a high-level flow chart of the key distribution procedure followed by the emitter.

FIG. 2 shows a high-level flow chart of the key distribution procedure of the emitter 10. Before starting to transmit quantum systems, the processing unit 13 sets the counter 14 to zero. Using the random number generator 15, the processing unit 13 produces then one random bit of information and stores it in a local memory. This random bit of information is used to set the basis used for the first block of key. It is called emitter block basis information. The processing unit 13 is then ready to initiate the quantum system transmission procedure. Source 11 produces one quantum system. For each quantum system sent, the processing unit 13 uses the random number generator 15 to produce one random bit of information. This bit is called emitter bit value information. Along with the current block basis information, this random bit is used to determine which transformation is applied by the preparation device 12 to the quantum system produced by the source 11. Within a given key block, the emitter sends only two out of four states—either {|+x>, |−x>}, or {|+y>, |−y>}. The processing unit 13 then increases the counter 14. If the counter 14 is smaller than n—the number of bits in a block— it relaunches the quantum system transmission procedure. If the counter is equal to n, the processing unit 13 resets the counter 14 to zero. It then uses the random number generator 15 to produce a random bit of information which is stored and will serve as block basis information for the next block of key. Finally, the processing unit 13 relaunches the quantum system transmission procedure.

Figure 3:
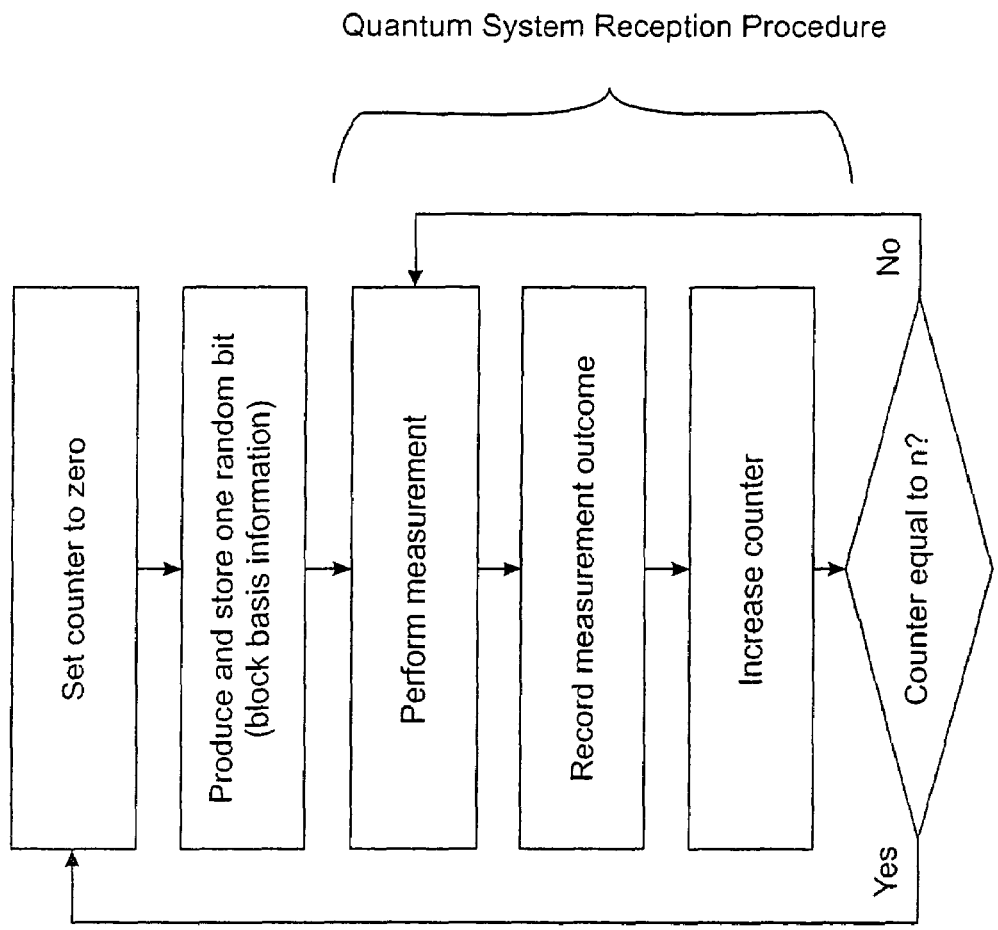
FIG. 3 shows a high-level flow chart of the key distribution procedure followed by the receiver.

FIG. 3 shows a high-level flow chart of the key distribution procedure of receiver 40. Before starting to receive quantum systems, the processing unit 43 sets the counter 44 to zero. Using the random number generator 45, the processing unit 43 produces then one random bit of information and stores it in a local memory. This random bit of information is used to set the basis used for the first block of key that will be received. It is called receiver block basis information. The processing unit 43 is then ready to initiate the quantum system reception procedure. For each incoming quantum system, the processing unit 43 uses the current block basis information to define the measurement performed by the analysis device 41. Within a given key block, the receiver will measure all the received quantum systems in the same basis or equivalently perform the same measurement—either $\sigma_x$ or $\sigma_y$. The detection unit 42 is used to record the result of the measurement performed by the analysis device 41. This measurement result is stored in the processing unit 43 along with current block basis information. The processing unit 43 then increases the counter 44. If the counter 44 is smaller than n—the number of bits in a block—it relaunches the quantum system reception procedure. If the counter is equal to n, the processing unit 43 resets the counter 44 to zero. It then uses the random number generator 45 to produce a random bit of information which is stored and will serve as basis information for the next block of key. Finally, the processing unit 43 relaunches the quantum state transmission procedure.

The emitter 10 and the receiver 40 repeat the key block transmission procedure several times in order to accumulate key material. They proceed then with the key distillation protocol. Key distillation starts with basis reconciliation. During this first phase, the emitter 10 and the receiver 40 compare the basis they used for each block of key by communicating over the conventional channel 30. If the bases agree, the whole block is kept. If the bases disagree, the whole block is discarded. FIG. 4 shows an example of the key exchange procedure and of the basis reconciliation. It shows for three subsequent blocks, the block basis information and the bit value of the emitter 10, the block basis information and the measurement result of the receiver 40, and the key after basis reconciliation.

The emitter and the receiver follow then the other steps of the procedure of key distillation comprising for example QBER estimate, error correction and privacy amplification.

This idea does not only work with BB84 protocol, but it can naturally be extended to other protocols. Similarly, it can be applied to cases where one basis comprises more than two states.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method for exchanging a secure cryptographic key for a quantum cryptography apparatus employing non-ideal elementary quantum states, wherein
   the apparatus comprises an emitter and a receiver, being connected by a quantum channel and a conventional communication channel,
   the emitter choosing a block size N, wherein N>=2,
   the receiver using the same said block size N,
   the emitter generating a random bit for each block to define an encoding basis,
   the receiver generating a random bit for each block to define a measurement basis,
   the emitter encodes blocks of N bits at random onto a number of non-orthogonal states belonging to at least two suitable sets, where the same encoding basis is used for all N bits within a given block,
   the receiver randomly chooses the analysis measurement for every block of N bits within said suitable sets, where the same measurement basis is used for all N bits within a given block.

2. The method according to claim 1, wherein every bit of each emitter block of N bits is treated in an equivalent receiver block of N bits within the receiver.

3. The method according to claim 1, wherein only blocks of N bits of the key are kept, if the randomly chosen encoding basis and measurement basis are compatible.

4. The method according to claim 2, wherein only blocks of N bits of the key are kept, if the randomly chosen encoding basis and measurement basis are compatible.

* * * * *